W. W. CROOKER.

Improvement in Barrel-Heads.

No. 132,752. Patented Nov. 5, 1872.

Witnesses:

Inventor:

UNITED STATES PATENT OFFICE.

WILLIAM W. CROOKER, OF WAUKEGAN, ILLINOIS.

IMPROVEMENT IN BARREL-HEADS.

Specification forming part of Letters Patent No. 132,752, dated November 5, 1872.

*To all whom it may concern:*

Be it known that I, WILLIAM W. CROOKER, of Waukegan, in the county of Lake and State of Illinois, have invented a new and useful Improvement in Strengthening the Heads of Barrels and Casks; and I do declare that the following is a true and accurate description thereof, reference being had to the accompanying drawing and to the letters of reference marked thereon and being a part of this specification, in which—

Figure 1:
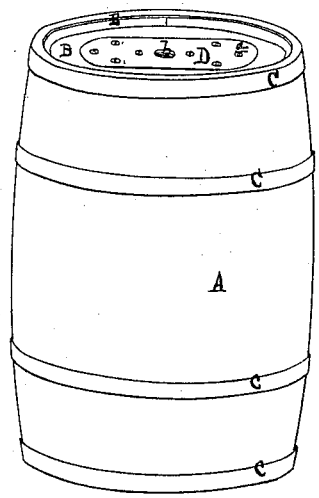
Figure 2:
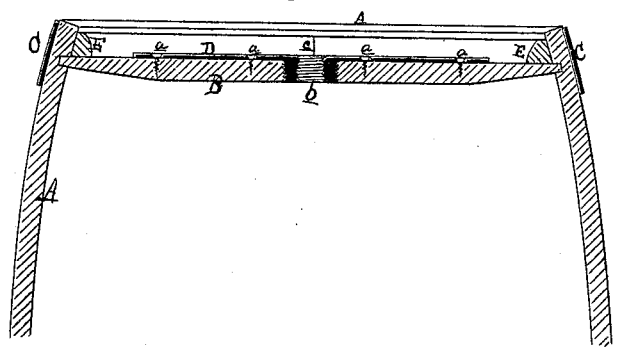

Figure 1 is a perspective view of a barrel with my improvement, and Fig. 2 is an enlarged vertical section of the upper half of the barrel.

Like letters refer to like parts in each figure.

The nature of this invention relates to an improvement in the construction of barrels which are to contain mineral waters and other gaseous liquids, and has for its object to so strengthen the heads as to enable them to resist the internal pressure of the gases confined in the barrel. The invention consists in a malleable-iron plate secured by screws to each of the heads, one of said plates being cast with a bush, which passes through the head, and is tapped, so that a faucet may be screwed in for drawing off the contents; also in the peculiar chine-lining bent in one piece to form a butt-joint, and of such section that it will resist the bulging of the barrel-head and require no fastening by nails or otherwise to keep in place after being sprung in.

In the drawing, A represents the staves of a barrel, and B is the head crozed in the chine-groove, the staves being hooped or banded, as at C. D is a malleable cast-iron disk, one of which is secured to each head by wood-screws $a$. One of these plates is cast with a bush, $b$, threaded externally and internally, so that it may be screwed into a hole in the head before fastening it in place with the screws. The internal thread receives a screw-plug to close the cask in shipment, and is replaced by a cock or faucet when the contents are to be drawn off. To strengthen the periphery of the head, which is necessarily chamfered on the inner side, I employ a head-lining, E, of the section shown in Fig. 2, bent in one piece to a circle, and of such length that it will require to be sprung in to form the butt-joint $c$, forming a conical annulus, the upward movement of which will be resisted by the cone formed by the staves at the ends of the barrel, thus enabling it to prevent the bulging or bursting of the head, from the enormous pressure generated in barrels containing mineral waters or gaseous liquids, when agitated by the jolting of a vehicle in transportation.

What I claim as my invention, and desire to secure by Letters Patent, is—

The malleable-iron plate D, with the threaded bush $b$, secured to the head of a barrel, substantially in the manner and for the purpose set forth.

WILLIAM W. CROOKER.

Witnesses:
WM. H. LOTZ,
EMILE WAGNER.